US010058966B2

(12) United States Patent
Zagar

(10) Patent No.: US 10,058,966 B2
(45) Date of Patent: Aug. 28, 2018

(54) END EFFECTOR

(71) Applicant: Zagar Inc., Cleveland, OH (US)

(72) Inventor: Brian Zagar, Cleveland, OH (US)

(73) Assignee: ZAGAR INC., Cleveland, OH (US)

( * ) Notice: Subject to any disclaimer, the term of this patent is extended or adjusted under 35 U.S.C. 154(b) by 267 days.

(21) Appl. No.: 15/086,260

(22) Filed: Mar. 31, 2016

(65) Prior Publication Data
US 2016/0207155 A1 Jul. 21, 2016

Related U.S. Application Data

(62) Division of application No. 14/571,380, filed on Dec. 16, 2014, now Pat. No. 9,308,592, which is a division of application No. 12/842,513, filed on Jul. 23, 2010, now Pat. No. 8,926,240.

(51) Int. Cl.
B23Q 11/10 (2006.01)
B23Q 1/62 (2006.01)
B23Q 3/00 (2006.01)
B23C 1/025 (2006.01)
B23C 5/28 (2006.01)
B23Q 5/04 (2006.01)

(52) U.S. Cl.
CPC ......... *B23Q 11/1023* (2013.01); *B23C 1/025* (2013.01); *B23C 5/28* (2013.01); *B23Q 1/621* (2013.01); *B23Q 1/626* (2013.01); *B23Q 3/002* (2013.01); *B23Q 5/043* (2013.01); *B23Q 2220/006* (2013.01); *Y10S 901/41* (2013.01); *Y10T 409/30812* (2015.01); *Y10T 409/303976* (2015.01); *Y10T 409/307952* (2015.01); *Y10T 409/309464* (2015.01)

(58) Field of Classification Search
CPC .......... B23C 1/025; B23C 5/28; B23Q 1/621; B23Q 1/626; B23Q 3/002; B23Q 5/043; B23Q 11/1023; B23Q 2220/006; Y10S 901/41; Y10T 409/303976; Y10T 409/307952; Y10T 409/30812; Y10T 409/309464
See application file for complete search history.

(56) References Cited

U.S. PATENT DOCUMENTS

| 4,000,954 | A | * | 1/1977 | Patel | .................. | B23Q 3/15706 |
|---|---|---|---|---|---|---|
| | | | | | | 279/50 |
| 4,759,115 | A | * | 7/1988 | Kielma | ................. | B23B 31/265 |
| | | | | | | 29/426.3 |
| 5,350,263 | A | | 9/1994 | Fedeli | | |
| 5,836,068 | A | * | 11/1998 | Bullen | ................... | B23Q 11/06 |
| | | | | | | 29/33 K |
| 6,398,468 | B1 | * | 6/2002 | Bayer | ................. | B23Q 1/0036 |
| | | | | | | 384/493 |

(Continued)

OTHER PUBLICATIONS

International Search Report and Written Opinion dated Feb. 17, 2012 of corresponding International Patent Application No. PCT/US2011/041556, filed Jun. 23, 2011.

*Primary Examiner* — Christopher M Koehler
(74) *Attorney, Agent, or Firm* — Pearne & Gordon LLP

(57) ABSTRACT

A quill style drilling/milling end effector with high tool positioning accuracy, a pressure foot with fast response in force and displacement feedback, and with automatic mounting and dismounting, normality sensing, and through the tool coolant delivery.

1 Claim, 7 Drawing Sheets

(56) References Cited

U.S. PATENT DOCUMENTS

| | | | |
|---|---|---|---|
| 6,430,472 B1* | 8/2002 | Boillot | G05B 19/056 |
| | | | 219/121.61 |
| 7,367,097 B2 | 5/2008 | Nakamura et al. | |
| 7,367,762 B2 | 5/2008 | Takase et al. | |
| 7,547,169 B1* | 6/2009 | Zagar | B23B 31/263 |
| | | | 33/639 |
| 8,267,188 B2* | 9/2012 | Nicholson | B23Q 1/4876 |
| | | | 173/197 |
| 2002/0136612 A1* | 9/2002 | Martinez | B23Q 1/70 |
| | | | 408/14 |
| 2010/0101360 A1* | 4/2010 | Tokumitsu | B25J 5/04 |
| | | | 74/490.06 |

* cited by examiner

END EFFECTOR

FIELD OF THE INVENTION

The invention relates to machine tools and, more particularly, to end effectors typically used with robots.

RELATED ART

Traditionally, the machining or other like work on large bodies or assemblies has been accomplished with even larger equipment that has a bed for receiving or holding the body and for supporting and driving tools at a point or points in the space surrounding the body. In more recent times, industrial robots have been available to position and support tools for operation on large bodies. Conventional machines, whether a large monument type, or a gantry type have limitations on the accuracy by which they can position and hold a tool with respect to the body being machined or otherwise operated on. As technology has advanced, there has developed a need for precision positioning of tooling or other instrumentalities that exceeds the capability of conventional equipment to machine large parts, bodies or assemblies. The size and mass of the machinery as well as temperature conditions are factors that contribute to making the task of holding accurate machining tolerances difficult if not impractical. Further, active joints, bearings, slides, couplings, and the like can introduce lash, again, making precise positioning of tooling elements difficult.

Applications of a robotic end effector can benefit from or require a pressure foot that first engages the work before a tool is deployed. It can be desirable to automatically remove a pressure foot from an end effector, for example, when its function is not required, when automatic tool changes require removal of the pressure foot, or when a different pressure foot is needed.

Some applications require that the end effector extend a tool towards the workpiece in a direction that is precisely normal to the surface to be worked. Many applications can require or benefit from coolant delivery through the tool. Weight of an end effector is a disadvantage in robotic applications since the size of a robot is typically dependent on the weight it must support and, generally, the larger the robot, the slower and less accurate it is. It is, therefore, desirable that the elements and instrumentalities employed to obtain these and other beneficial features allow an end effector to be compact and low in mass.

SUMMARY OF THE INVENTION

The invention provides an improved quill style drilling/milling end effector with high tool positioning accuracy, a pressure foot with fast response in force and displacement feedback and with automatic mounting and dismounting, normality sensing, and through the tool coolant delivery. Accurate tool positioning is accomplished with a micro positioner that is interposed between the end effector carrier, typically a robot arm or a gantry machine, and the tool spindle. The micro positioner can be operated after the macro positioning carrier has located the tool spindle as close as practical to the site at which work is to be performed. This arrangement enables the micro positioner to eliminate imprecision in the carrier positioning of the end effector relative to the specified machining location.

In a preferred arrangement, the micro positioner comprises two slides arranged with axes perpendicular to one another and perpendicular to the spindle axis of the end effector, thus affording two additional positioning axii to the host robot or other carrier. The slides are arranged on-center with the drilling/milling axis of the end effector, thereby avoiding excessive eccentric loading of the end effector and simplifying position control.

The disclosed micropositioning system works with a pressure foot device that effectively couples and stabilizes the robot arm relative to the workpiece before the micro positioner is operated. This arrangement enables the micro positioner to reliably eliminate errors in the robot positioning of the end effector relative to the desired machining location.

The disclosed end effector accessories are uniquely developed and arranged for a quill style end effector and achieve benefits that are not readily obtainable with other drilling/milling end effector designs.

DESCRIPTION OF THE PREFERRED EMBODIMENTS

Figure 1:
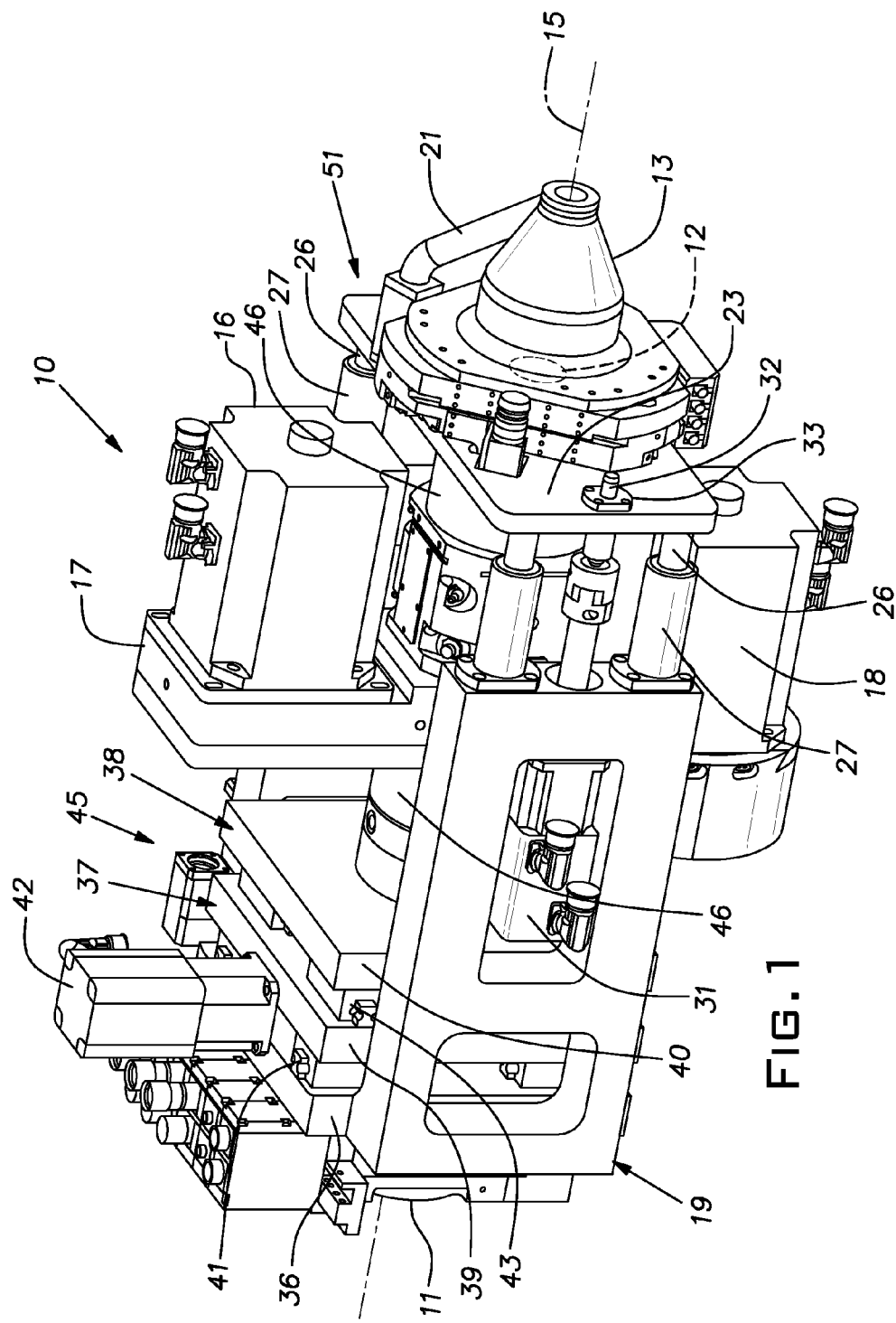
FIG. 1 is a front isometric view of an end effector unit embodying aspects of the invention.
Figure 2:
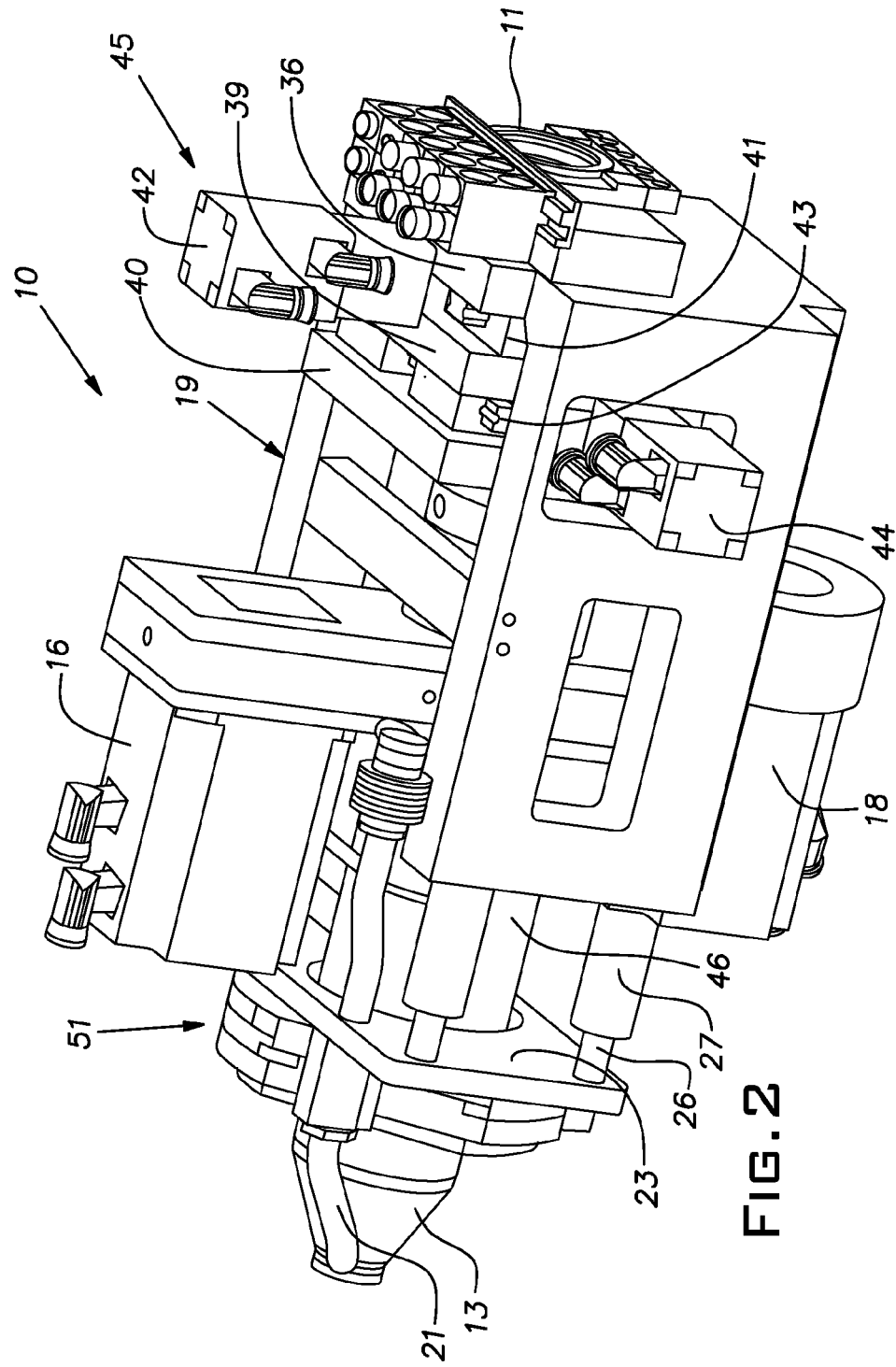
FIG. 2 is a rear isometric view of the end effector unit.
Figure 3:
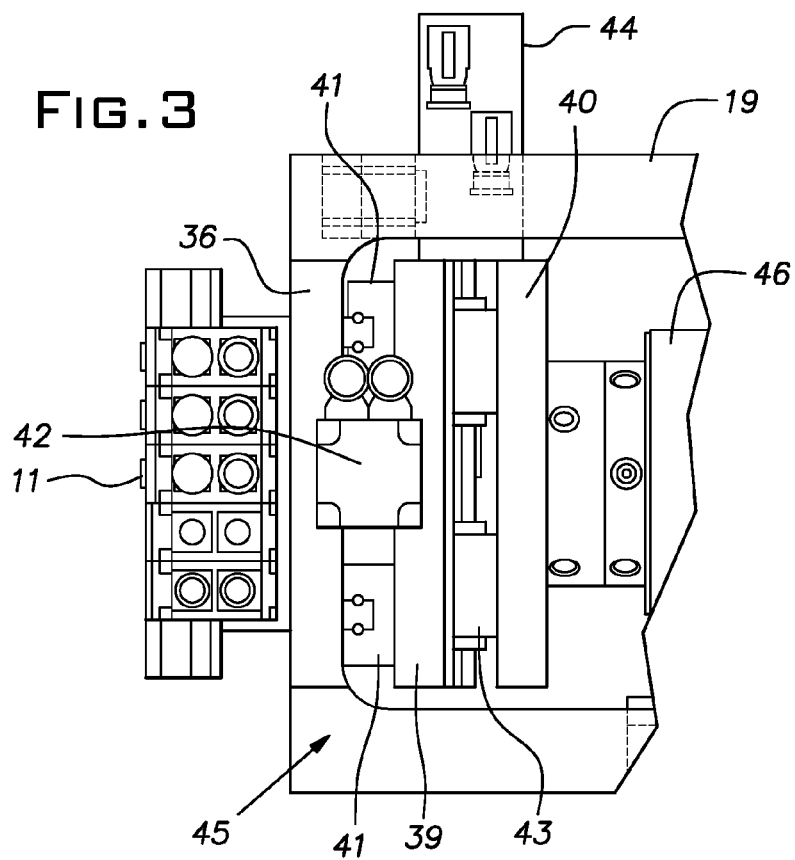
FIG. 3 is a fragmentary top view of the end effector unit showing details of the micro positioner.
Figure 4:
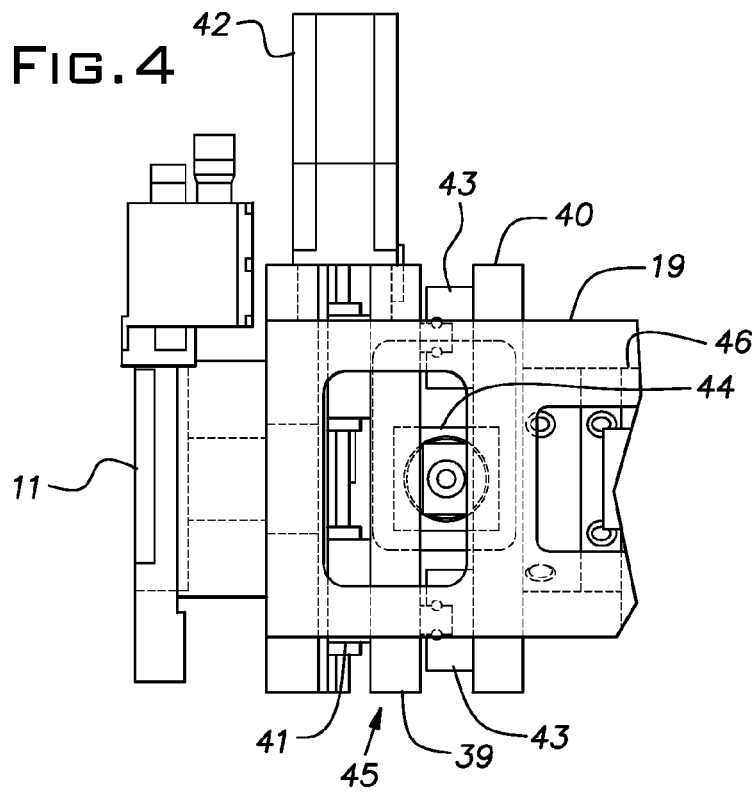
FIG. 4 is a fragmentary side view of the end effector unit showing the micro positioner.

Referring now to FIGS. 1 and 2, a drilling/milling end effector unit 10 is adapted to be supported by an industrial robot through a tool side 11 of a tool changer. The illustrated end effector 10 is similar in construction to that disclosed in U.S. Pat. No. 7,547,169, the disclosure of which is incorporated herein by reference. The end effector unit 10 has a spindle indicated in phantom at 12 rotatable about an axis 15. The forward end of the spindle 12 is surrounded by a hollow nose or cone 13.

An electrically driven servomotor 16 at the top of the unit 10 drives an axial quill feed through a belt within a housing 17. Another electrically operated servomotor 18 at the bottom of the unit 10 drives the spindle 12 through an associated belt. The end effector unit 10 includes a frame or pressure bridge 19, U-shaped in plan view, to which the tool changer 11 is attached and which supports the remaining components of the unit. The tool changer tool side 11, which can be a commercially available unit such as manufactured by ATI Industrial Automation, Inc. of Apex, N.C. 27539, USA, is fixed on a rear face of the pressure bridge 19. The tool side 11 is arranged to automatically couple with a complementary master side of a tool changer fixed to the end of an arm of an industrial robot such as manufactured by KUKA Roboter GmbH. The changer tool side 11, in addition to automatically coupling the pressure bridge 19 to a robot arm, provides for utilities including electrical signals, air pressure, and coolant to be supplied to the end effector unit 10. A vacuum tube 21 runs between the interior of the spindle nose 13 and the changer tool side 11 for collecting machining chips and debris.

The spindle nose 13 is removably attached to a plate or pressure foot 23 by a tool changer 51. The tool changer 51 is shown in greater detail in FIGS. 5 and 6 and discussed below. The pressure foot plate 23 is carried on four guide rods 26 distributed about and parallel to the spindle axis 15. The guide rods 26 slide in linear bearings 27 fixed to the front of the pressure bridge frame 19 enabling the pressure foot 23 and spindle nose 13 to move in the axial direction of the spindle 15 relative to the frame. An associated electrically operated servomotor 31 fixed on the frame 19 rotates a helical screw shaft 32 in a ball nut 33 fixed on the plate 23 to positively mechanically extend or retract the plate and spindle nose 13. The servomotor 31, operated by the end effector controller, feeds back electrical signals through the tool changer represented by the tool side 11 to the end effector controller that indicate the angular displacement of the motor 31 from a reference position and the torque being applied by the motor. These signals are essentially instantaneous indications of the extension of the spindle nose 13 and the force being applied by the spindle nose. The speed or response of these signals can be used by the end effector controller to achieve a fast machine cycle time. Moreover, the spindle nose extension or displacement data supplied by the servomotor 31 can be compared with that provided by a linear transducer connected between the pressure bridge 19 and the pressure foot plate 23 to detect an error in either of these signals.

Mounted on an inner face of a rear wall 36 of the pressure bridge frame 19 are two slides 37, 38. Each slide 37, 38 has a table 39, 40 capable of moving in an associated plane parallel to the wall 36 and perpendicular to the spindle axis 15. A first slide 37 moves vertically, in the orientation of the unit 10 shown in FIGS. 1 and 2, relative to the pressure bridge frame 19 on linear bearings 41 supported directly on the wall 36. Precision displacement of the slide 37 is produced by an associated electrically operated servomotor 42 mounted on the frame 19. The second slide 38 is mounted on the first slide 37 and moves vertically with the first slide and horizontally relative to the first slide and the frame 19 on linear bearings 43 carried on the first slide table 39. Precision displacement of the second slide 38 is produced by an associated electrically operated servomotor 44 mounted on the first slide 37.

Together, the slides 37, 38 and actuators or servomotors 42, 44 comprise a two-axis micro positioner 45 that can adjust the spindle 12 along two mutually perpendicular axiis that are each perpendicular to the spindle axis 15. Each of the slides 37, 38 is capable of moving a total of, for example, 1" along its respective axis. Ideally, a spindle housing 46 fixed to the slide table 40 is located so that when each of the slides 37, 38 is in its center position, the spindle axis 15 is coincident with these center positions. Together, the slides 37, 38 and associated servomotors 42, 44 provide adjustment in any direction in a plane perpendicular to the spindle axis 15. While the displacement available at the slides 37, 38 is limited, this displacement provides an adjustability much greater than the positioning accuracy of a typical robot sized to handle the weight of the end effector 10.

More specifically, the end effector unit 10 can be mounted on the end of a robot arm so that the end effector can be coarsely brought into working position relative to a workpiece. The workpiece can be relatively large in comparison to the unit 10, being, for example, at least several times as large. A robot large and strong enough to support the unit 10 throughout a major part of the space surrounding a large workpiece may have limited accuracy in positioning the unit, and such accuracy may not be sufficiently precise to satisfy the manufacturing specifications of the large workpiece. A robot of a size adequate to handle the end effector unit may have, for example, a positional accuracy of about ±0.020". The micro positioner 45 of the invention overcomes this positioning limitation of a robot by precisely locating the end effector unit 10 relative to a workpiece within, for example, about ±0.0002" in a plane generally parallel to the workpiece surface. Various techniques, including use of an optical target, can be used by the robot and end effector unit controller or controllers to operate the micro positioner 45 to precisely locate the spindle axis 15 in space relative to the workpiece. When a controller determines a positioning error smaller than that ordinarily taken up by a robot or other manipulator of the end effector unit 10, the controller can energize either or both of the micro positioner servomotors 42, 44 to precisely align the spindle axis 15 with the work site. During the time that a positioning error is found and while the micro positioner 45 is being operated, the pressure foot plate 23 operating through the spindle nose 13 serves as a bridge between the robot and the workpiece with enough force to effectively lock these objects together. This same stabilization effect of the extended pressure foot plate 23 is utilized during actual drilling/milling operation of the end effector 10. With the pressure foot plate 23 and spindle nose 13 extended against the workpiece, for example, laminations of material of the workpiece can be held in contact with one another to obtain uniform results.

When the controller operating the end effector unit 10 has determined that the unit is located within acceptable limits through operation of the micro positioner 45, the end effector is deployed to machine an area of the workpiece. Ordinarily, the pressure foot plate 23 and spindle nose 13 are retracted during gross positioning of the end effector by a robot or other manipulating device. As previously indicated, the pressure bridge frame 19 and spindle nose 13 are extended or retracted by operation of the servomotor 31.

As suggested, applications of an end effector can benefit from or require a pressure foot that, through a spindle nose 13, for example, first engages the work before a tool such as a drill bit is deployed. Moreover, it can be desirable to automatically remove a spindle nose or other extension of a pressure foot from an end effector when its function is not required, when automatic tool changeover requires removal of the spindle nose, and/or when a different spindle nose is needed.

Figure 5:
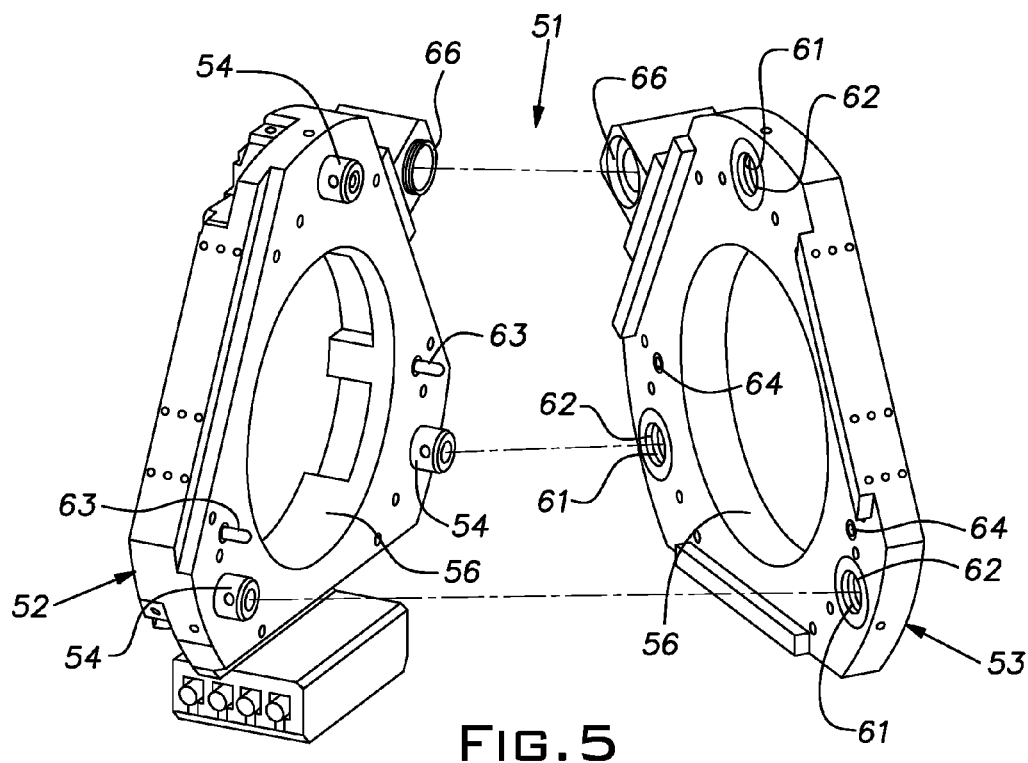
FIG. 5 is a view of a tool changer with the master and tool sides separated.
Figure 6:
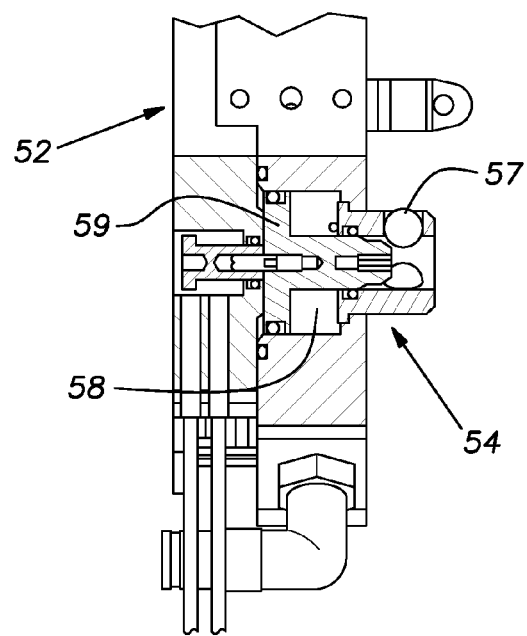
FIG. 6 is a cross-sectional view of a ball coupling of the tool changer of FIG. 5.

An automatic tool changer 51 of special construction disposed between the spindle nose 13 and the pressure foot plate 23 enables these operations to be performed automatically. FIG. 5 illustrates a master side 52 and a tool side 53 of the tool changer 51 spread apart to show certain details of these components. Each side 52, 53 is a generally flat plate with a triangular outer profile and a large central bore 56, the latter preferably being sufficiently large to fit around the spindle and housing 46. A plurality of three ball locks 54 are fixed on an outer radial face of the master side 52 symmetrically disposed around the bore 56. Each ball lock 54, as shown schematically in cross-section in FIG. 6, has a cylindrical body carrying a set of radially movable balls 57. The balls 57 are held in radially outward positions by air pressure introduced into a chamber 58 on an inner face of a piston 59 and are released when air pressure is introduced into the chamber 58 at an outer face of the piston 59. The chambers 58 of the ball locks 54 on one side of their respective pistons 59 are interconnected, and on opposite sides of the respective pistons are similarly interconnected. Pressurized air is admitted to one or the other sides of the pistons 59 under the control of the end effector unit controller. It will be seen that when the pistons 59 are moved outwardly, the balls 57 are caromed and held radially outwardly. In their radially outward positions, the balls 57 are received in internal grooves 61 in bores 62 that receive the cylindrical ball lock bodies 54. When the balls 57 are extended into the internal grooves 61 in the tool side 53, the master and tool sides 52, 53 are locked together. The master and tool sides 52, 53 when initially being joined, are mutually aligned by two pins 63 projecting axially from a face of the master side 52. The pins 63 are received in complementary holes 64 in the tool side 53. Male and female brackets 66 on the periphery of the sides 52, 53 couple the vacuum tube 21 to the spindle nose 13. The spindle nose 13 is rigidly bolted to the tool side 53 and the master side is rigidly bolted to the pressure foot plate 23. The large bore 56 of the master and tool sides 52, 53 enables the lead end of the end effector unit spindle housing 46 to extend through it. This enables the housing 46 to be positioned as close as practical to the workpiece so that the spindle 12 and the quill (like that shown in FIG. 9) are supported with a minimum cantilever effect even when the quill is extended.

Figure 7:
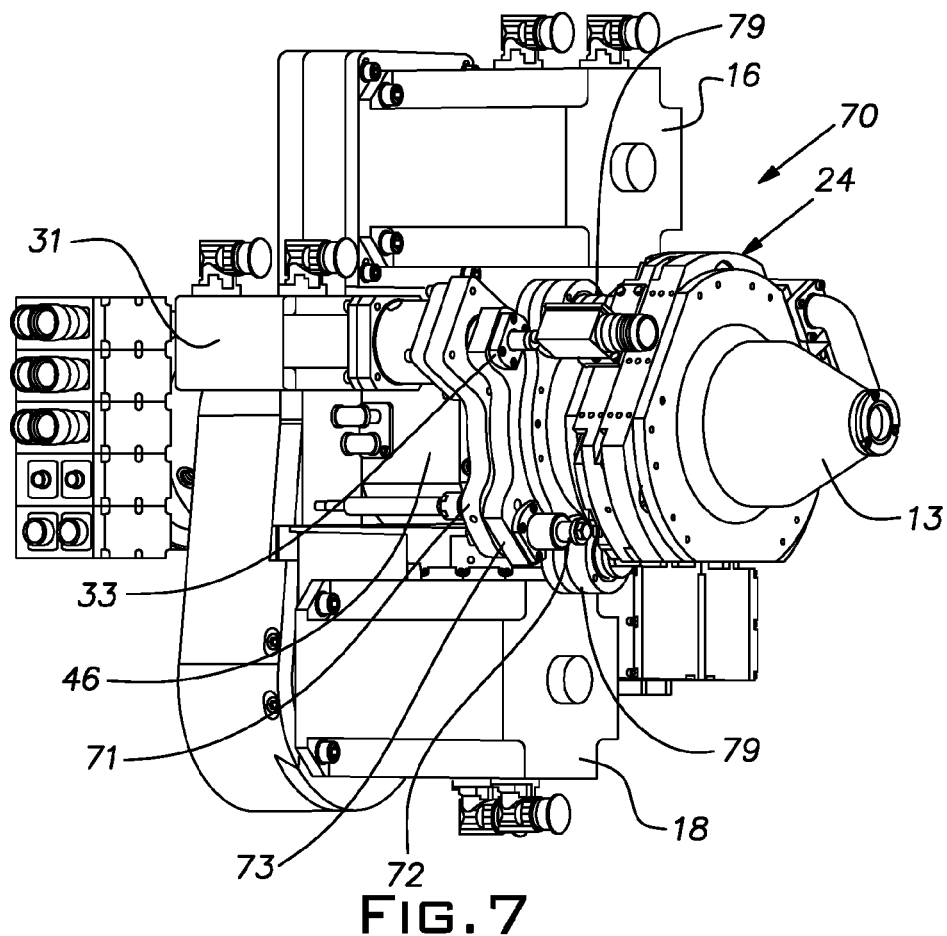
FIG. 7 is a front perspective view of a second embodiment of an end effector unit.
Figure 8:
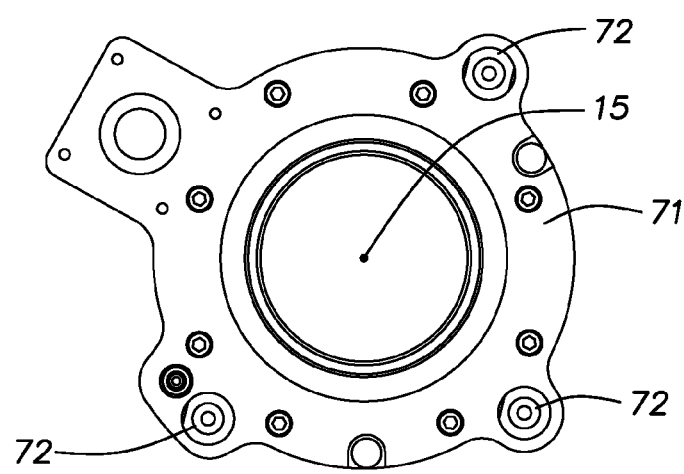
FIG. 8 is a diagram illustrating the relative positions of certain elements of the end effector of FIG. 7.
Figure 9:
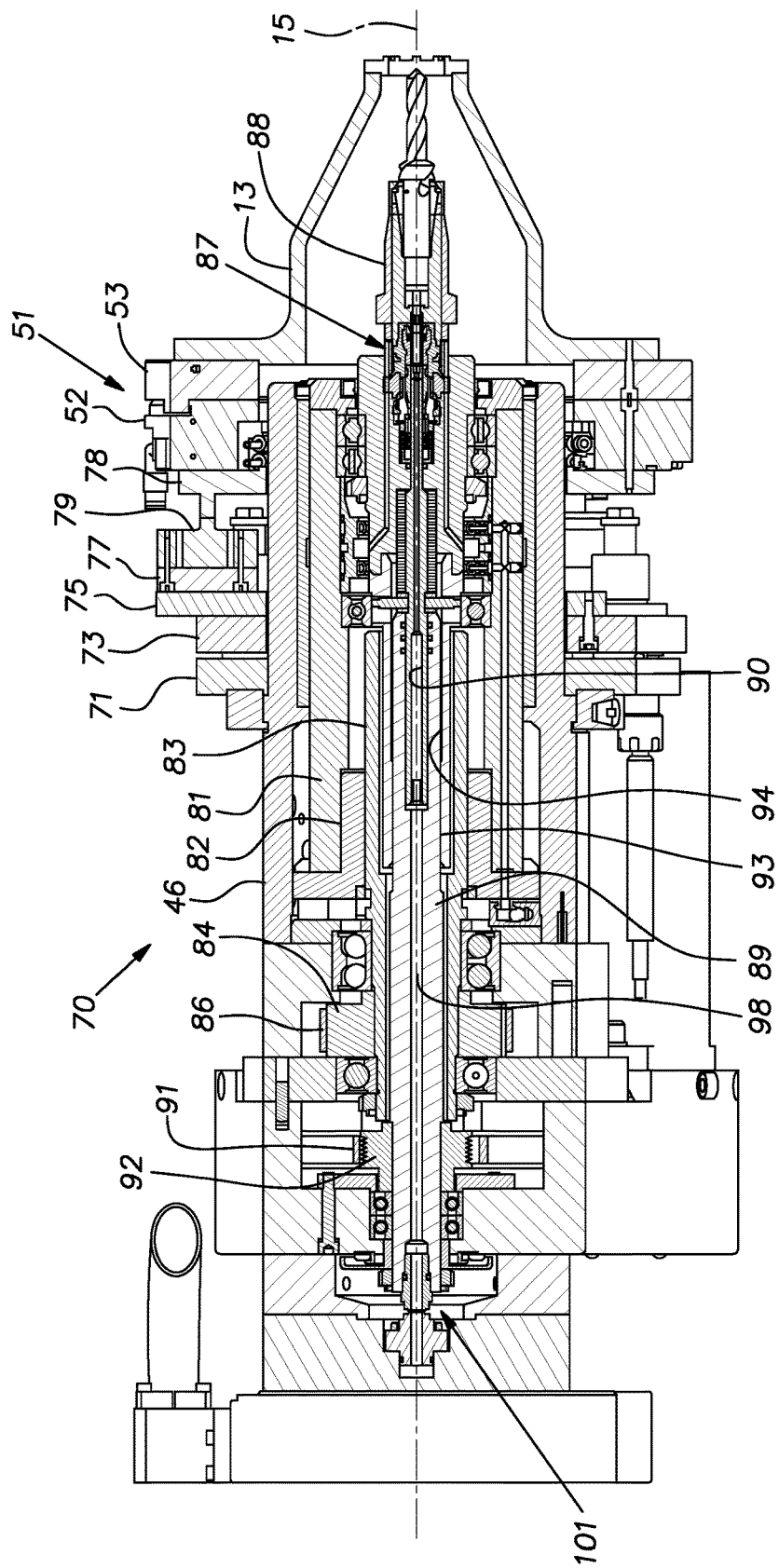
FIG. 9 is a longitudinal cross-sectional view of the spindle area of the end effector of FIG. 7.

FIGS. 7-9 illustrate another end effector unit 70; parts that are identical or have substantially the same function to those shown in the embodiment of FIGS. 1-6 are identified with the same numeral. A bolster plate 71 is fixed to the spindle housing 46. Three cantilevered, axially oriented guide rods 72 extend rigidly from the front face of the bolster plate 71. FIG. 8 diagrammatically illustrates the location of these guide rods 72 relative to the spindle axis 15. A pressure foot plate 73 has linear bearing units 74 that receive the guide rods 72 and enable the plate 73 to translate in the axial direction away from and towards the bolster plate 71. Bolted to the pressure foot plate 73 is a transducer or load cell assembly 76 which comprises an adapter plate 75 carrying a load cell plate 77. Three load cells 79, equally spaced angularly and radially about the axis 15, are mounted on the load cell plate 77. A pressure plate 78, a part of the load cell assembly 76, bears against the load cells 79. The master side 52 of a tool changer 24 is bolted to the forward side of the pressure plate 78. The tool side 53 of the tool changer 24 carries a spindle nose 13.

It will be understood that the plates 73, 75, 77 and 78 each have a bore sized to slip over the quill end of the housing 46. The load cells 79 are force transducers of, for example, of the Hall Effect type and measure axial force applied by the spindle nose 13. A servomotor 31, under control of the end effector controller, rotating a ball shaft in a ball nut 33 moves the spindle nose 13 against a workpiece or retracts the spindle nose. It will be understood that the end effector unit 70, like the end effector 10, is supported in an operating position on the end of a robot arm or other manipulating device. At the rear of the end effector unit 70, a tool side 11 of an automatic tool changer is fixed to the unit. While not shown, a tool changer tool side for mounting either end effector units 10 or 70 can be fixed to a side of the unit where the geometry of the workpiece relative to the manipulating device is benefited.

The array of load cells 79 detects the normality or perpendicularity of the spindle axis 15 to the surface of the workpiece by differential force or displacement readings. When the servomotor 31 presses the spindle nose 13 against the workpiece, one or two of the load cells 79 will be compressed to a greater degree than two or one of the other load cells where normality is absent. The load cell or load cells on the acute side of the angle made between the spindle axis 15 and a plane tangent to a workpiece surface will experience greater compression. The load cell signals are relayed to the robot or other machine controller ordinarily through connectors at the rear tool changer 11 to enable the controller to reposition the end effector 70 through robot movement so that the spindle axis 15 is more nearly perpendicular to the workpiece surface to be machined.

FIG. 9 is a longitudinal cross-sectional view of the end effector unit 70. The quill 81 is driven axially forward or rearward by a ball nut 82 threaded on a ball screw 83. The ball screw 83 is rotated by the servomotor 16 (FIG. 7) through a sheave 84 and belt 86. A spindle assembly 87 carrying an automatic tool clamp 88 is rotated by a drive shaft 89. The drive shaft 89 is driven by the servomotor 18 (FIG. 7) through a belt 91 and sheave 92. An external spline 93 on the drive shaft 89 mates with an internal spline 94 of the spindle assembly 87 to accommodate axial movement of the spindle assembly with the quill 81 relative to the drive shaft 89. The automatic tool clamp 88 can be a commercially available unit such as manufactured by HSK. The tool clamp 89 is biased to a closed position by spring packs 95, 96 (FIG. 9B) operating on a draw bar 97 running along the axis 15. As explained more fully in aforementioned U.S. Pat. No. 7,547,169, the automatic tool clamp 88 is opened or released when the quill 81 is fully withdrawn into the housing 46 and the forward end of the drive shaft 89 compresses the spring packs 95, 96. The rear end of the draw bar 97 is received in a counterbore 90 in the forward end of the drive shaft 89. Both the drive shaft 89 and draw bar 97 have central axially extending bores 98, 99 that communicate with one another. Extension and retraction of the quill 81 causes the rear or tail end of the draw bar 97 to telescope out of or into the forward end of the drive shaft 89.

Figure 9A:
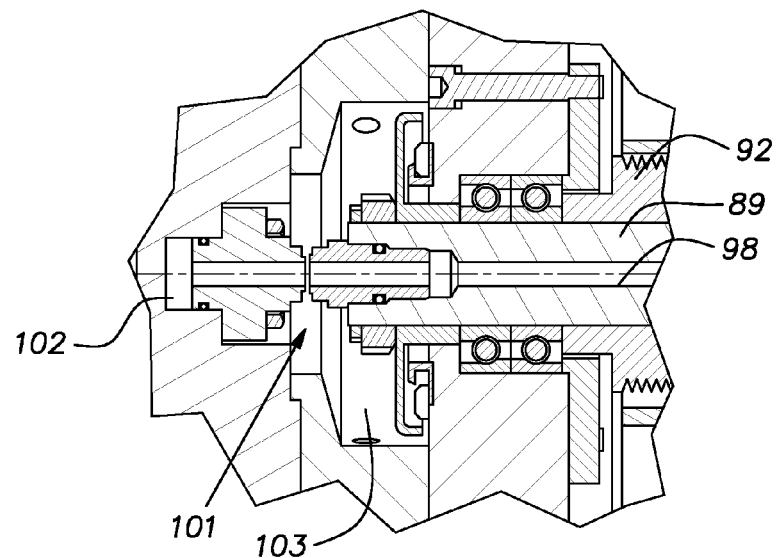
FIG. 9A is an enlarged cross-sectional view of the rear end of the end effector of FIG. 7.
Figure 9B:
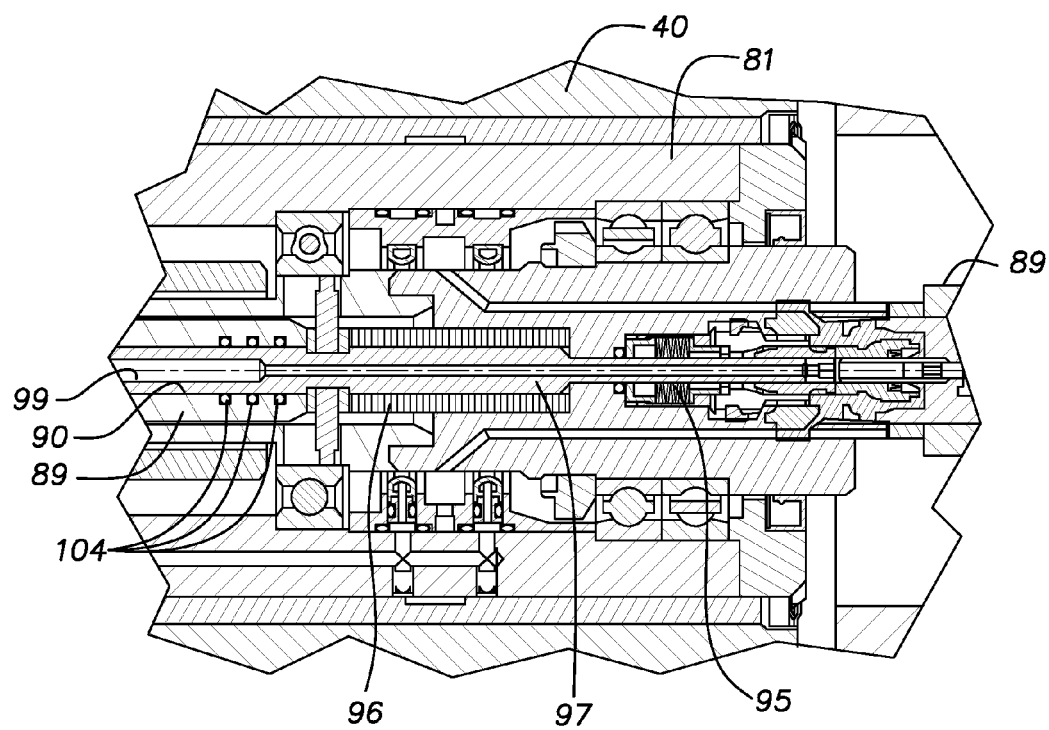
FIG. 9B is an enlarged cross-sectional view of the spindle end of the end effector of FIG. 7.

Referring to FIG. 9A, the rear end of the drive shaft 89 is fitted with a rotating union 101. The rotating union may be a commercially available unit such as manufactured by Deublin Company headquartered in Waukegan, Ill. USA. Coolant or air can be admitted into a chamber 102 behind the stationary part of the rotating union to supply coolant through the drive shaft and draw bar bores 98, 99 to the automatic tool clamp 88 and ultimately to the drill or tool held in the tool clamp. A chamber 103 drains coolant which may return from the bores 98, 99 when the unit 70 is idling or otherwise inactive. A series of O-ring seals 104 are disposed in the counterbore 90 in the forward end of the drive shaft 89 for sealing on the exterior of the draw bar 97 to contain the coolant in the bores 98, 99.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described or in any other way that is inconsistent with the extent to which the progress in the art has been advanced by the invention.

What is claimed is:
1. An end effector for drilling and/or milling comprising a quill housing, a quill in the housing, a spindle rotatably supported in the quill for rotation about an axis, the quill being guided for axial reciprocation along the axis of the spindle, the spindle including an automatic tool clamp on an end thereof, a spindle drive shaft axially fixed and rotatably supported in the quill housing, a draw bar for opening and closing the automatic clamp, a rear end of the draw bar being telescoped in a forward end of the spindle drive shaft, the spindle drive shaft and the draw bar having central passages along their respective lengths and in communication with each other to supply coolant from a rear end of the spindle drive shaft to the automatic tool clamp, and a seal, disposed between an inside of the spindle drive shaft and an exterior of the draw bar to resist coolant leakage through telescoped areas of the spindle drive shaft and draw bar.

* * * * *